United States Patent [19]

Bräu et al.

[11] Patent Number: 5,322,990
[45] Date of Patent: Jun. 21, 1994

[54] APPARATUS FOR READING CODING ON A MOVING CODING CARRIER, ESPECIALLY A TRAVELLING FABRIC WEB

[75] Inventors: Jürgen Bräu; Jürgen Eisen, both of Augsburg, Fed. Rep. of Germany

[73] Assignee: Erhardt + Leimer GmbH, Augsburg, Fed. Rep. of Germany

[21] Appl. No.: 918,199

[22] Filed: Jul. 22, 1992

[30] Foreign Application Priority Data

Aug. 1, 1991 [DE] Fed. Rep. of Germany ....... 4125462

[51] Int. Cl.⁵ ............................................... G06K 7/00
[52] U.S. Cl. .................................... 235/440; 235/435; 235/439
[58] Field of Search .................. 235/435, 439, 440

[56] References Cited

U.S. PATENT DOCUMENTS 4,673,803 6/1987 Zerle et al. ........................ 235/474

FOREIGN PATENT DOCUMENTS 1213654 3/1966 Fed. Rep. of Germany .

Primary Examiner—Donald Hajec
Assistant Examiner—T. N. Forbus, Jr.
Attorney, Agent, or Firm—Herbert Dubno

[57] ABSTRACT

A device for reading code lines on a moving carrier in which the lines extend transverse to the direction of movement. The reading head extends across the web and has a row of sensors subdivided into groups. The sensors of each group have a length equal to the maximum length of the coding traces and the total row has a substantially greater length so that the sensors are subdivided along the row into groups. The signals from sensors of preceding groups in a direction of signal flow along the row are summed e.g. at operational amplifiers before being summed with the corresponding sensor outputs of subsequent groups.

14 Claims, 4 Drawing Sheets

APPARATUS FOR READING CODING ON A MOVING CODING CARRIER, ESPECIALLY A TRAVELLING FABRIC WEB

FIELD OF THE INVENTION

Our present invention relates to the reading of coding on a moving carrier, for example, a fabric web, where the coding may consist of a succession of lines of different lengths passing beneath a reading head. More particularly the invention relates to improvements in the reading head and the circuitry associated therewith.

BACKGROUND OF THE INVENTION

It is known to provide a traveling web, e.g. a fabric at the time of manufacture with coding elements in the form of coding traces which extend transversely of the direction of travel of the web, parallel to one another in spaced relationship in the direction of travel. The coding tracings can be markings intended to be optically sensed or tracings detected by other sensor means, for example magnetic sensors. The coding may be applied at the time of manufacture and can identify different patterns, regions of the fabricated web, or the like.

Reading heads for such codes on code carriers can have a row of sensors responsive to the coding elements and the length of the row, which can extend transversely of the direction of travel, can be large and the mutual spacing of the sensors along the row can be small with respect to the maximum length of the coding elements or traces which can be of different length to convey the coded information. An evaluating circuit can be provided for the sensor signals.

In an earlier conventional device utilizing these principles, the total length of the sensor row defines the width of the reading region within which the coding can be detected and read. This reading width is greater than the maximum trace length of the coding so that the coding can be evaluated independently of its exact position in the reading region. As a consequence, there is no need to provide exact positioning of the code carrier as it travels by the reading region. Since the coding will always lie in the reading region the coding traces will not give rise to errors of the kind which has troubled earlier systems. Furthermore, errors along the length of a coding trace are eliminated.

For evaluating the sensor signal, this earlier system requires, independently from the reading width and from the total number of sensors in the row, only as many signal processing channels as will correspond to sensors along a coating trace of maximal length.

With this limitation in the signal processing channels, the signals from those sensors which correspond to the length of a coating trace are delivered to the signal processing channels.

In U.S. Pat. No. 3,790,756, the output signals of all signals after digitalizing, are fed to a shift register which is read out into the signal processing channels. The signal shifting in the register is effected until a first sensor signal appears at the register location corresponding to the first signal processing channel. This method has been found to have the disadvantage that, for each sensor, a respective circuit is required for digitalizing the sensor signal and by the need for shift registers with register locations for all of the sensors. With a large number of sensors this could be achieved only at high cost. Another drawback was the sensitivity of the device to noise or spurious signals which could appear at the sensors without having been generated by coding traces and could contribute errors in the read out of the signal processing channels with the result that false signal processing an signal evaluation can occur.

OBJECTS OF THE INVENTION

It is, therefore, the principal object of the present invention to provide an apparatus of the type described so that high reading reliability can be achieved with simple construction and low cost of reading head and associated circuitry.

Another object of this invention is to provide an improved reading apparatus whereby drawbacks of earlier systems are obviated.

SUMMARY OF THE INVENTION

These objects are achieved, in accordance with the invention in an apparatus for reading coding on a moving coding carrier, especially a traveling fabric web, having coding elements in the form of coding traces of different lengths extending transversely to a travel direction of the web and spaced apart in the travel direction, the apparatus comprising:

a row of spaced apart sensors responsive to the traces, extending transverse to the travel direction above the coding carrier, a length of the row being large and a mutual spacing of the sensors of the row being small by comparison to a maximum trace length of the traces, and an evaluating circuit connected to the row and processing signals from the sensor, the circuit having signal-processing channels of lesser number than the total number of sensors in the row, the row of sensors being subdivided into groups of successive sensors of the row, with each group extending over at least the same length in the row direction as the maximum trace length and having the same number of sensors as the evaluating circuit has signal processing channels;

means being provided for combining the sensor signals in a signal flow direction along the sensor row being fed to the signal processing channels so that the signal of each sensor of a second group and a signal of the sensor at the corresponding location of the first group together form a summation signal;

the signal of each sensor of a third of the groups and the summation signal of the sensors of the corresponding locations of the first and second groups and, correspondingly, from each further group are combined to a further summation signal; and the summation signals formed respectively with the signals of the sensors of a last group in the signal flow direction are applied to the signal processing channels of the evaluating circuit.

By subdividing the sensors into groups whereby each group has a length in the direction of the row at least equal to the length of the maximum coding length and so that each group includes the same number of sensors as required to feed the signal processing channels and by providing the sensor signals along the length of the row to the signal processing channels so that the signals of the sensors upstream in the signal flow direction forms summation signals which are combined with the corresponding signals from each group downstream of two or more groups producing summation signals, a significant improvement over the art has been found.

The signal of each sensor of the third group and the summation signals of the sensors from the same position of the first and second groups and correspondingly the signals of the sensors of still further groups enable the signals always to be joined in further summation signals which ultimately are applied to the signal processing channel.

As a coding trace sweeps past the sensors and triggers in the appropriate number of them at a predetermined location in the group, a respective signal, it is important, for an error free operation that no further sensor at this location in any of the other groups be triggered and especially not when the coding is detected by the sensors of two groups. This is the consequence of having the maximum length of a coding trace at most equal to the length of one of the sensor groups so that with a coding trace of maximum length only as many sensors will be triggered as occupy a signal group. If a plurality of sensors at the same location in different groups are triggered, this must constitute an error which can be easily detected by the formation of summation signals from all the sensors of all groups because of the deviation from the customary signal level during signal processing.

The formation of the summation signal can be analog and can be effected without specific cost with respect to circuitry. It is possible, for example, to eliminate the need for shift registers. The reading width can be easily varied while the requisite conditions are maintained since that only requires the number of sensor groups to be varied. The number of sensors per group and thus the resolution of the reading process as well as the summing signal formation and the signal processing can remain unchanged.

In a preferred embodiment, the sensor signal of the sensor of one group is combined in the summation by subtraction of that signal from the summation signal of the corresponding signals of all previous groups.

In that case, the condition is a vector addition adding the sensor signal as a negative value. This has the advantage that errors derive from signals from sensors at the same location at different groups will eliminate one another in pairwise fashion. If the number of groups in the complete sensor row is an even number as is preferred, in the last group in the signal flow direction there will be a quenching of the error signal when the sensors at the corresponding locations in all groups produce the respective error signals.

This is especially of advantage with sensors operating by the detection of electrical and or magnetic fields which are easily influenced by environmental electrical or magnetic effects so that, in the case of an error, it is improbable that many or all of the corresponding sensors in the row will supply the error signals.

In a preferred embodiment, the formation of the summation signal is so effected that for each sensor of a group a respective operational amplifier is provided and the sensing signal of this sensor is fed to one input of the operational amplifier while the summation signal of corresponding sensors of all previous groups in the signal flow direction is fed to the summation point of this operational amplifier and preferably the other input. The operational amplifier thus forms the algebraic sum of the two signals and outputs an optionally inverted summation signal to the operational amplifier of the corresponding sensor of the next group in the signal flow direction.

The advance of this arrangement is that each group of sensors and the associated operational amplifiers can be assembled into a module and the modules forming the complete sensor row can be fitted into one another to provide a row of these modules having a terminal module ahead of the first module in the signal flow direction for supplying the operational amplifiers. To vary the total reading width, one need only add a module or a number of modules with the corresponding numbers of sensors and operational amplifiers. Each module can include a circuit board connected as is necessary to the preceding and succeeding modules.

Errors can be easily detected and the error signals suppressed where the sensors which generate the error signals of the same location are provided in a multiplicity or all groups, especially when the sensors are electromagnetic sensor readily triggered by electromagnetic spurious fields.

According to a feature of the invention, the sensors include devices for generating magnetic fields and sensing elements responsive to these magnetic fields while the coding elements are composed of materials which impulse magnetic fields or include materials which influence magnetic fields.

In an especially advantageous embodiment, the sensors are so-called magnetic field plate sensors or magnetoresistive sensors which, for particularly effective error suppression, can be magnetoresistive differential sensors.

With field plate sensors, the sensing elements are magnetic field sensitive electric resistors. Instead, however, it is possible to form the sensors as Hall generators.

From a respective view point, it is preferred to mount the magnetoresistive sensors in openings provided in a row of a printed circuit board common to all of the sensors of the module and to solder the terminals to the conductors of this board. An insulating strip can be applied directly over the magnetoresistors and their contacts and to the printed circuit board. Both sides of the magnetoresistive sensors can have insulated foils applied thereto to compensate for the difference in levels between the magnetoresistive sensors and the circuit board and which can insulate the circuit board relative to a thin copper foil covering the insulating strips and the insulating foils are contacting the edge of the circuit board. The copper foil can be overlain by a thin wear resistant cover layer.

The insulating foils can prevent the field plates from being unduly worn by the abrasive action of the coding carrier, namely, the fabric web, while the copper foil serves to conduct away electrostatic charge which might otherwise occur at the sensor surfaces. It should, therefore, be composed of very pure copper so that the magnetic field of the field plate magnets will not be effected.

The cover layer, of course, serves to protect this very soft copper from mechanical abrasion.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
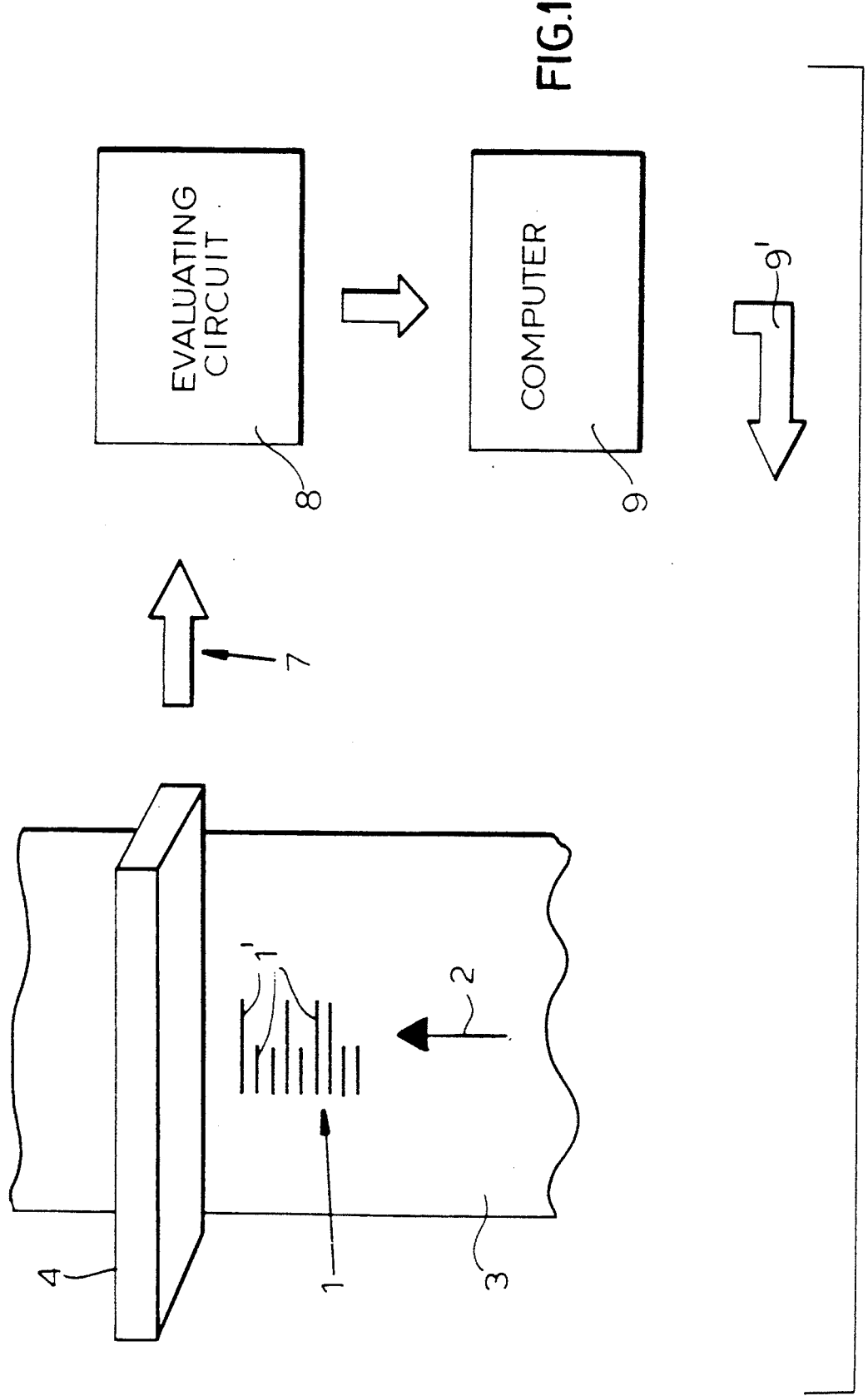
FIG. 1 is a schematic illustration of the reading device of the invention utilizing coding on a traveling fabric web.

In FIG. 1 we have shown the principles involved in the reading of a code 1 on a code carrier 3 movable in the direction of arrow 2 in the form of a travelling web. The coding may comprise code traces of elements one extending parallel to one another and spaced apart in the direction of travel 2. The coding traces being of different lengths.

In the embodiment illustrated the code is formed by full length traces and half length traces, a coding pattern which is known in the art. The traces themselves may be composed of magnetically affecting materials, such as iron wires, iron filaments embedded in threads of the fabric, or magnetic traces printed on the fabric.

Figure 2:
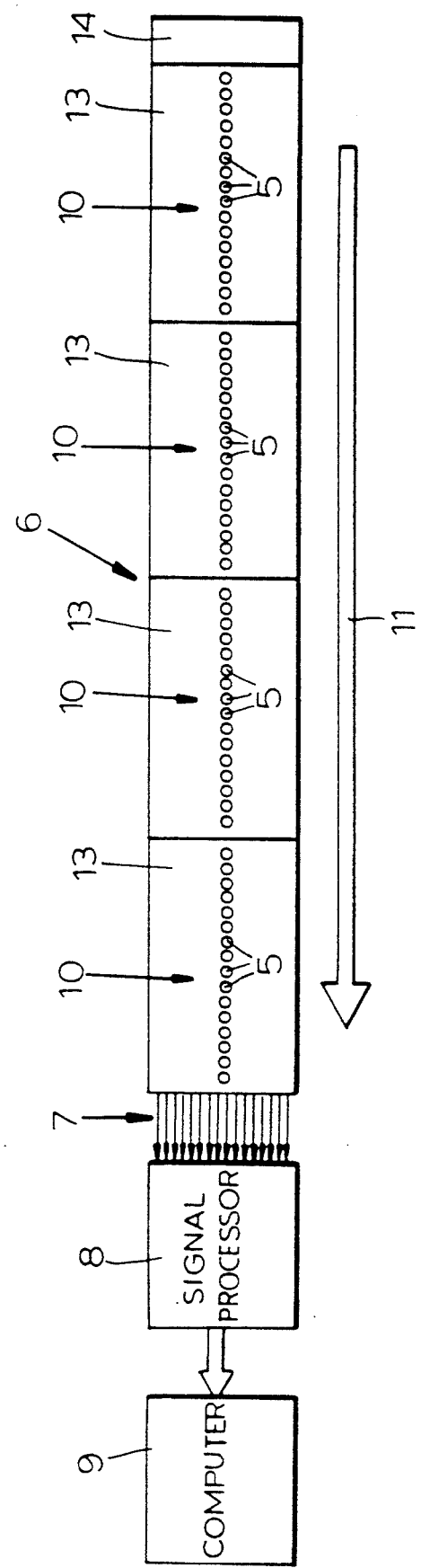
FIG. 2 is a more detailed showing of the reading device and, in block form, its connection to the signal processor.

The reading head 4 comprises a row 6 of sensors 5 spaced apart in a direction transverse of the direction of travel 2, i.e. in the direction 11 as represented in FIG. 2 and will be described in greater detail in connection therewith. The length of the sensor row 6 is large and the spacing of the sensors 5 is small by comparison to the length of the maximum-length elements 1' of the code.

The signals from the reading head 4 are supplied as represented by the signal processing channels 7 to an evaluating circuit 8 which can include a computer and can be of conventional design so that it need not be described in any detail. The computer itself is represented at 9 and the output from the computer is shown at 9' and can supply a memory, a display, a printout, or a signalling system for initiating a response to the code, for example, cutting of the fabric, terminating of the rolling up of the web and the beginning of the winding of a new roll, etc., etc.

As can be seen from FIG. 2, the row 6 of sensors 5 is subdivided into groups 10 each of the same number of sensors 5, each group having the same length as the maximum trace longitudinal of the coding elements 1'. The number of sensors 5 of each group is also equal to the number of channels in the signal processing bus 7 supplying the data process 8.

In the embodiment illustrated in FIG. 2, four sensor groups 10 are provided each with 16 sensors 5 corresponding to a 16 bit signal processing bus 7 or 16 signal processing channels of this bus. The sensor signals are transmitted along the sensor row 6 as shown in FIG. 2 in the direction of arrow 11 to the signal processing channels 7, the signal processor 8 and, ultimately, the computer 9 as has previously been described.

Figure 3:
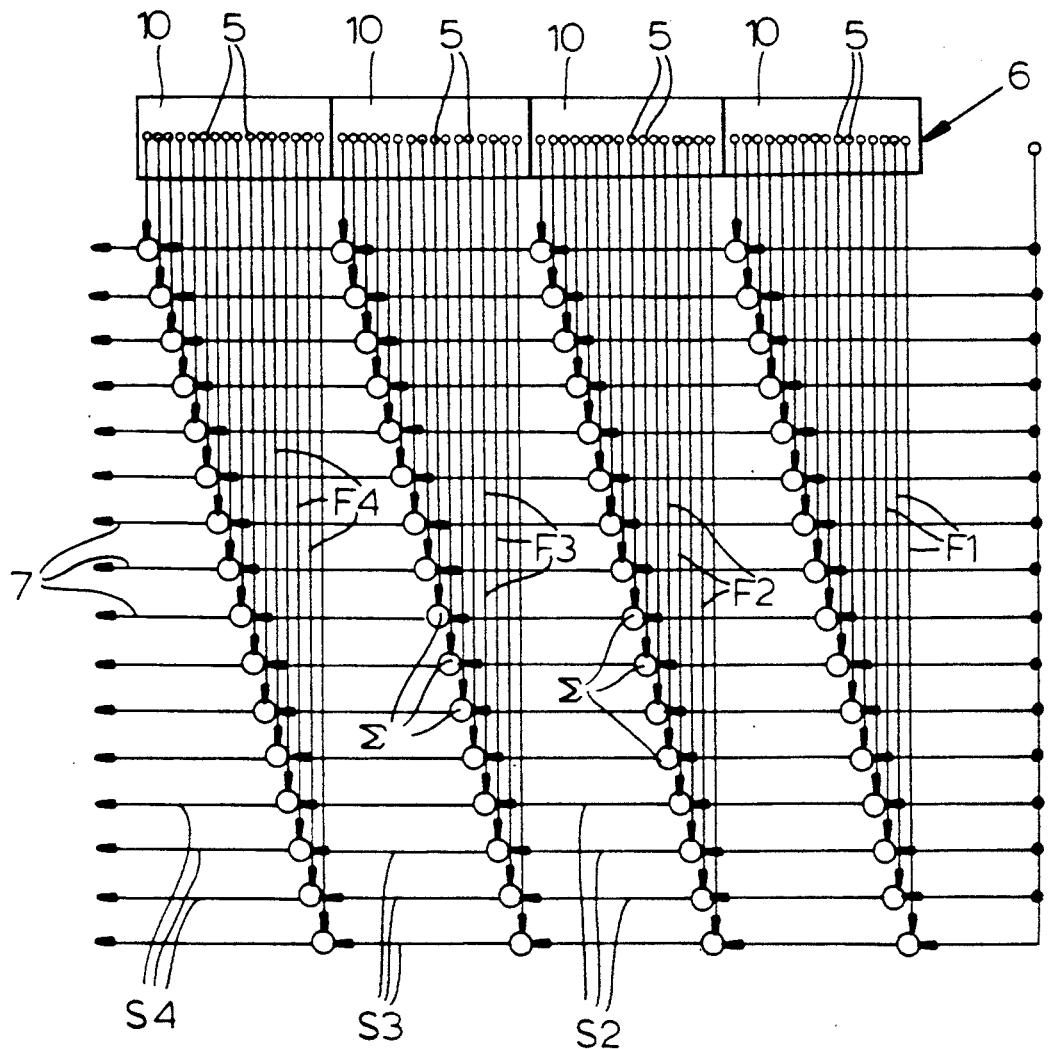
FIG. 3 is a signal flow diagram for the reading head of FIG. 2.

As can be seen from FIG. 3, the signal F2 from each sensor 5 of a second group in the signal flow direction 11 and the signal F1 of the respective sensor 5 in the same position in the first group are combined to form a corresponding summing signal F2, the circuits Σ being constituted as respective summing nodes.

Correspondingly, the signal F3 of each sensor of the third group and the summing signal S2 from the previous two groups and from the same locations of the respective sensors, are summed to a new summing signal S3 which is fed to the node of a signal F4 from the corresponding sensor of the fourth group. The resulting summation signals S4 are supplied through the respective signal processing channels to the processor 8.

The formation of the summing signals S2, S3, S4 in the summing circuits K can each be effected by a substraction of the summing signal there provided from he summing signal previously formed in an algebraic type of addition. Thus the substraction is effected from the summation signal of all previous groups.

As a result, sensor signals from two sensors 5 at the same location can nullify one another and a zero level signal supplied to the addition mode at which the sensor 5 of the next group supplies its signal. The number of groups should be an even number to nullify error signals in the system.

Figure 4:
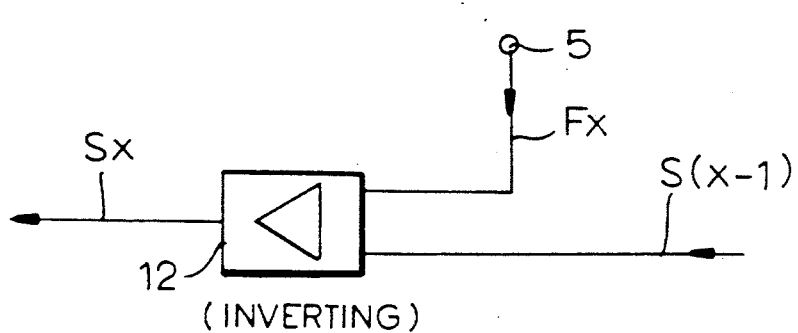
FIG. 4 is a circuit diagram showing the formation of the summation signal in the signal flow diagram of FIG. 3.

The circuits K in FIG. 3 can correspond to the operational amplifier 12 shown in FIG. 4. Each of the sensors 5 of each group 10 can be associated with such an operational amplifier. The sensor signal Fx of a sensor 5 and the summation signal $S(x-1)$ of the corresponding sensors form all previous groups is applied to the summation point of the operational amplifier 12. The summation signal Sx which is produced by the operational amplifier and is optionally inverted, is supplied to the operational amplifier of the next group in the flow direction and forms a summation signal with that sensor signal of the next group.

The sensors 5 of each group 10 are assembled together with their respective operational amplifier to a module 13 so that the entire row 6 is formed by fitting these modules 13 into one another as has been shown in FIG. 2. To connect the operational amplifier inputs to the electrical source, a first module in the form of a terminal module 14 is provided.

The sensors 5 comprise devices for generating magnetic fields in the form of permanent magnets not shown in the drawing and the sensors themselves are magnetic field detectors. Such sensors respond to the coding elements 1 which are composed of a material influencing the magnetic field or contain such material.

The coding elements 1' can, as noted, be metal filaments, stitched or knitted or embroidered into the fabric. The sensors themselves can be field plate sensors and especially field plate differential sensors, also known as magnetic resistors and differential magnetoresistors as described in Siemens AG *Sensoren, Mangetfeldhalbleiter, Teil I-Datenbuch* 1982/83 Pages 40 to 45; reference may also be made to the Siemens Publication Galvanomagnetic Devices Databook 1976/1977, pages 147–163. Instead of such sensors, Hall generators may be used as described at pages 19 to 21 of the former publication and pages 92 to 122 of the latter.

Figure 5:
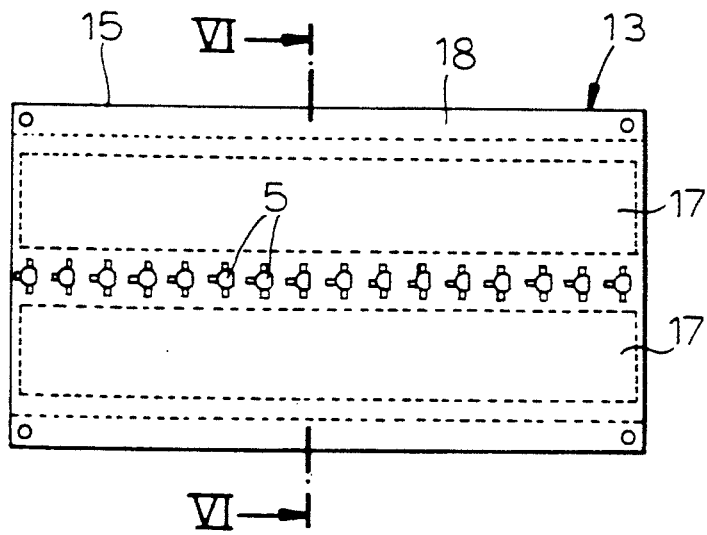
FIG. 5 is a diagrammatic plan view of one module of the reading head of FIG. 2.
Figure 6:
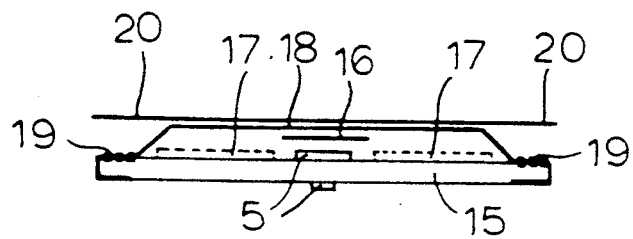
FIG. 6 is a diagrammatic section taken along the line VI—VI of FIG. 5.

The construction of a module 13 can be best seen in FIGS. 5 and 6. The sensors 5 are seated in openings in a printed circuit board 15 provided for each module. The operational amplifier included in this circuitry have not been shown in these figures.

The sensors 5 are soldered to the conductors of the printed circuit board. Directly above the magnetoresistors 5 are insulating strips 16 which also cover the contacts thereof.

To both sides of the sensors 5 are respective insulating foils 17 which compensate for level differences between the sensors 5 and the plate 15. The operational amplifiers 12 and the sensors 5 are insulatingly covered by these foils 17. Insulating strip 16 and the foils 17 also insulate the printed circuit board 15 against a thin copper foil 18 which contacts along the edge of the board 15 at 19. The copper foil is comprised of very pure and soft copper. A wear resistant cover layer 20 is applied on the copper foil 18 to protect it from wear.

We claim:

1. An apparatus for reading coding on a moving coding carrier in the form of a traveling fabric web, having coding elements in the form of coding traces of different lengths extending transversely to a travel direction of the web and spaced apart in the travel direction, said apparatus comprising:
   a row of spaced apart sensors responsive to the traces, said row extending transverse to the travel direction above the coding carrier, a length of the row being larger than a maximum trace length of the traces and a mutual spacing of the sensors of the row being smaller than said maximum trace length of the traces, and
   an evaluating circuit connected to said row, said evaluating circuit processing signals from said sensor, said circuit having a number of signal-processing channels less than the total number of sensors in the row,
   the row of sensors being subdivided into groups of successive sensors of the row, including a first group and a second group, with each group extending over at least the same length in the row direction as the maximum trace length and having the same number of sensors as the evaluating circuit has signal processing channels;
   means being provided for combining the sensor signals in a signal flow direction along the sensor row, wherein said sensor signals are fed to the signal processing channels so that the signal of each sensor of the second group and a signal of the sensor at the corresponding location of the first group together form a summation signal;
   the signal of each sensor of a third of said groups and the summation signal of the sensors of the corresponding locations of the first and second groups and, correspondingly, from each further group are combined to a further summation signal; and
   the summation signals formed respectively with the signals of the sensors of a last group in the signal flow direction are applied to the signal processing channels of the evaluating circuit.

2. The apparatus defined in claim 1 wherein the summation signals formed from the sensor signals of the sensors of one group are each formed by substraction of the sensor signals from summation signals of the corresponding sensors of all preceding groups.

3. The apparatus defined in claim 2 wherein the number of the groups forming the row is an even number.

4. The apparatus defined in claim 1 wherein each sensor of one group is connected to an input of a respective operational amplifier to which the sensor signal of that sensor is applied while from a summation point the summation signal of the corresponding sensors of all previous groups in the signal flow direction is applied to another input of the respective operational amplifier, and the resulting summation signal is fed to an operational amplifier of the corresponding sensor of the next group in the signal flow direction.

5. The apparatus defined in claim 4 wherein said resulting summation signal is inverted with respect to the sensor signal applied to the respective operational amplifier.

6. The apparatus defined in claim 4 wherein the sensors of each group and the respective operational amplifiers are joined to form a single structural module and a plurality of these modules are joined in a row by fitting them together, a terminal module being connected to the first module for wiring of the operational amplifiers.

7. The apparatus defined in claim 1 wherein each of said sensors includes a magnetic field detector, said apparatus further comprising means for generating a magnetic field in the region of said coding elements, said coding elements including means for influencing a magnetic field.

8. The apparatus defined in claim 7 wherein said sensors include magnetoresistive devices.

9. The apparatus defined in claim 8 wherein said magnetoresistive devices are magnetoresistive differential sensors.

10. The apparatus defined in claim 7 wherein s id sensors are Hall generators.

11. The apparatus defined in claim 8 wherein each sensor of one group is connected to an input of a respective operational amplifier to which the sensor signal of that sensor is applied while from a summation point the summation signal of the corresponding sensors of all previous groups in the signal flow direction is applied to another input of the respective operational amplifier, and the resulting summation signal is fed to an operational amplifier of the corresponding sensor of the next group in the signal flow direction.

12. The apparatus defined in claim 11 wherein said resulting summation signal is inverted with respect to the sensor signal applied to the respective operational amplifier.

13. The apparatus defined in claim 12 wherein the sensors of each group and the respective operational amplifiers are joined to form a single structural module and a plurality of these modules are joined in a row by fitting them together, a terminal module being connected to the first module for wiring of the operational amplifiers.

14. The apparatus defined in claim 13 wherein said magnetoresistive devices are disposed in openings in a common circuit board for all of the sensors of a respective module and soldered to conductors thereof, an insulating strip is applied to the magnetoresistive devices and covers contacts thereof, an insulating foil is disposed on opposite sides of the magnetoresistive devices to level out differences in level of the devices and the board, and the board is insulated from a thin copper foil which covers the insulating strip and the insulating foil and engages edges of the board, a thin wear-resisting coating being applied to said copper foil.

* * * * *